(12) United States Patent
Kawakami

(10) Patent No.: US 11,428,783 B2
(45) Date of Patent: Aug. 30, 2022

(54) OPTICAL APPARATUS, ON-BOARD SYSTEM, AND MOVING APPARATUS

(71) Applicant: CANON KABUSHIKI KAISHA, Tokyo (JP)

(72) Inventor: Tomoaki Kawakami, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 16/924,246

(22) Filed: Jul. 9, 2020

(65) Prior Publication Data

US 2021/0011127 A1   Jan. 14, 2021

(30) Foreign Application Priority Data

Jul. 10, 2019 (JP) .............................. JP2019-128046

(51) Int. Cl.
| | |
|---|---|
| *G01S 7/48* | (2006.01) |
| *G01S 7/481* | (2006.01) |
| *G01S 17/89* | (2020.01) |
| *G02B 26/10* | (2006.01) |

(52) U.S. Cl.
CPC .......... *G01S 7/4804* (2013.01); *G01S 7/4817* (2013.01); *G01S 17/89* (2013.01); *G02B 26/10* (2013.01)

(58) Field of Classification Search
CPC ...... G01S 7/4804; G01S 7/4817; G01S 17/89; G01S 17/00; G01S 17/894; G02B 26/10
See application file for complete search history.

(56) References Cited

U.S. PATENT DOCUMENTS

| | | | |
|---|---|---|---|
| 10,571,552 B1 * | 2/2020 | Gao | ..................... G01S 17/10 |
| 2013/0188043 A1 * | 7/2013 | Decoster | ................. G01S 17/89 |
| | | | 348/135 |
| 2018/0015918 A1 * | 1/2018 | Bae | ..................... B60W 30/09 |
| 2019/0146064 A1 * | 5/2019 | Hansson | ................ G01S 7/4876 |
| | | | 356/5.01 |

FOREIGN PATENT DOCUMENTS

| | | |
|---|---|---|
| JP | H10325872 A | 12/1998 |
| JP | 4476599 B2 | 6/2010 |
| JP | 2013072770 A | 4/2013 |

* cited by examiner

*Primary Examiner* — Luke D Ratcliffe
(74) *Attorney, Agent, or Firm* — Rossi, Kimms & McDowell LLP

(57) ABSTRACT

An optical apparatus includes a deflector configured to deflect illumination light from a light source unit to scan an object and to deflect reflected light from the object, and a controller configured to control the deflector. A first divergence angle of the illumination light in a first cross section is larger than a second divergence angle in a second cross section orthogonal to the first section. The controller controls the deflector so that the illumination light moves in the first cross section at a first speed and moves in the second cross section at a second speed higher than the first speed.

15 Claims, 7 Drawing Sheets

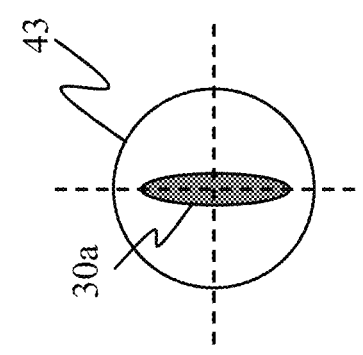
FIG. 5A
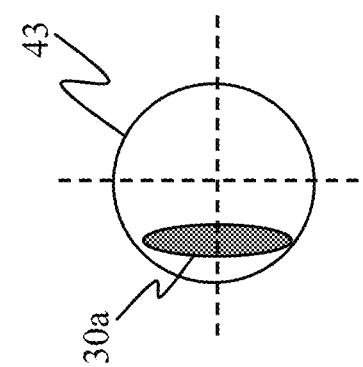
FIG. 5B
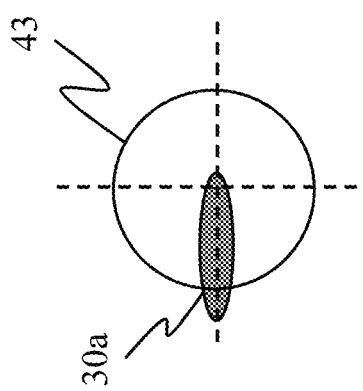
FIG. 5C
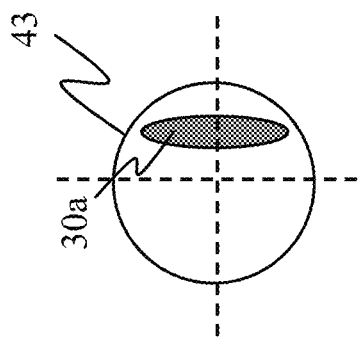
FIG. 5D
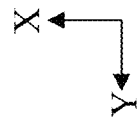

OPTICAL APPARATUS, ON-BOARD SYSTEM, AND MOVING APPARATUS

BACKGROUND OF THE INVENTION

Field of the Invention

The present invention relates to an optical apparatus, an on-board system, and a moving apparatus, each of which detects an object (or target) by receiving reflected light from an illuminated object.

Description of the Related Art

LiDAR (Light Detection and Ranging) is one known method for measuring a distance to the object, and calculates a distance based on a time for receiving reflected light from the illuminated object and a phase of the reflected light. Japanese Patent No. 4476599 discloses a configuration that measures a position and distance of the object based on an angle of a deflector (drive mirror) and a signal obtained from the light receiving element when the reflected light from the object is received by the light receiving element.

When the distance to the object is long, it takes a long time from when the illumination light is emitted to the object to when the reflected light returns from the object and thus the angle of the drive mirror significantly changes. A driving amount of the drive mirror changes depending on states of the deflection angle and frequency of the drive mirror in addition to the distance to the object. As the drive mirror moves, the light receiving optical path may shift from the light receiving element. In this case, a light amount received by the light receiver may decrease, and the measurement performance may deteriorate.

SUMMARY OF THE INVENTION

The present invention provides an optical apparatus, an on-board system, and a moving apparatus, each of which can satisfactorily detect objects in a range from a short distance to a long distance regardless of a state of a drive mirror.

An optical apparatus according to one aspect of the present invention includes a deflector configured to deflect illumination light from a light source unit to scan an object and to deflect reflected light from the object, and a controller configured to control the deflector. A first divergence angle of the illumination light in a first cross section is larger than a second divergence angle in a second cross section orthogonal to the first section. The controller controls the deflector so that the illumination light moves in the first cross section at a first speed and moves in the second cross section at a second speed higher than the first speed.

An on-board system and a moving apparatus having the above optical apparatus also constitute another aspect of the present invention.

Further features of the present invention will become apparent from the following description of exemplary embodiments with reference to the attached drawings.

BRIEF DESCRIPTION OF THE DRAWINGS

FIGS. 5A to 5D illustrate a relationship between a light receiving surface and an imaging area.

DESCRIPTION OF THE EMBODIMENTS

Figure 1:
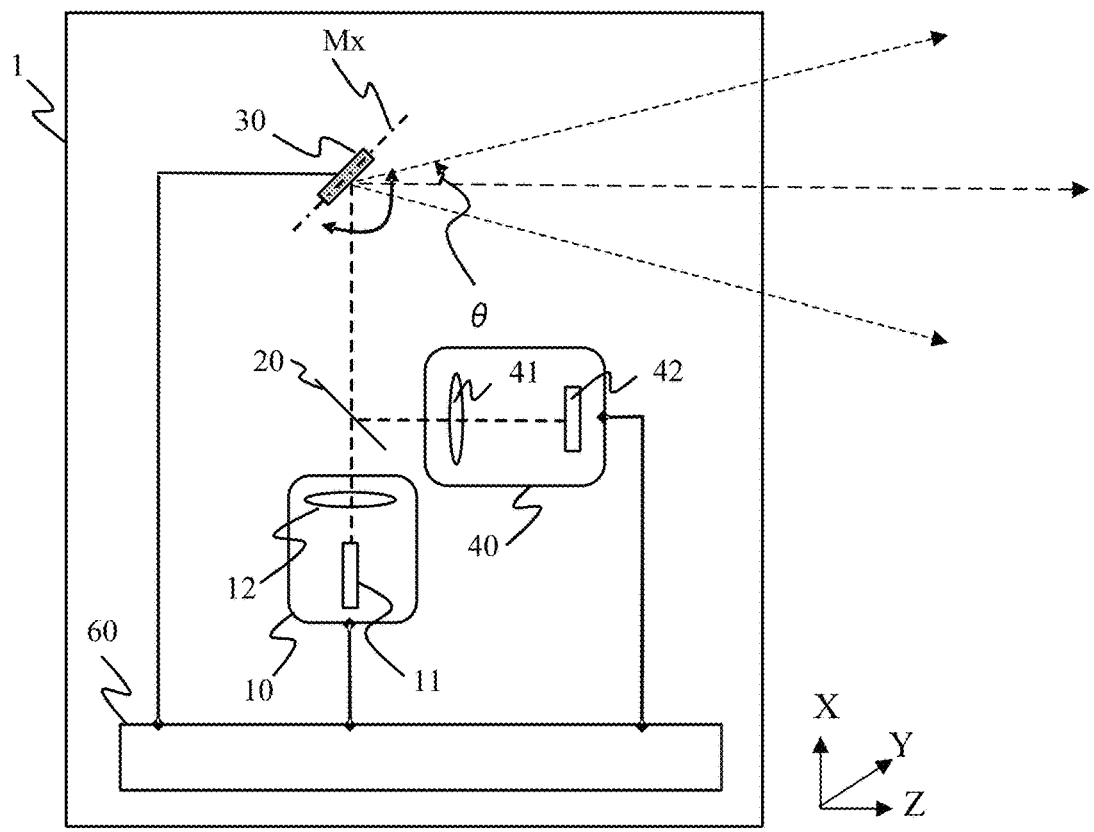
FIG. 1 schematically illuminates an optical apparatus according to a first embodiment.

Referring now to the accompanying drawings, a detailed description will be given of embodiments according to the present invention. Corresponding elements in respective figures will be designated by the same reference numerals, and a duplicate description thereof will be omitted.

An optical apparatus using LiDAR includes an illumination system that illuminates an object, and a light receiving system that receives reflected light or scattered light from the object. In LiDAR, there are a coaxial system in which the optical axes of the illumination system and the light receiving system coincide with each other, and a non-coaxial system in which their optical axes do not coincide with each other. The optical apparatus according to this embodiment is suitable for LiDAR of the coaxial system.

First Embodiment

FIG. 1 schematically illustrates an optical apparatus 1 according to this embodiment. A light source unit 10 includes a light source 11 and a collimator 12 that approximately collimates divergent light from the light source 11. The light source 11 may be a single mode LD (laser diode), a multimode LD, or a multistack LD having a plurality of stacked layers for providing an output. In emitting a high-output laser beam, a multistack multimode LD is often used.

Figure 2:
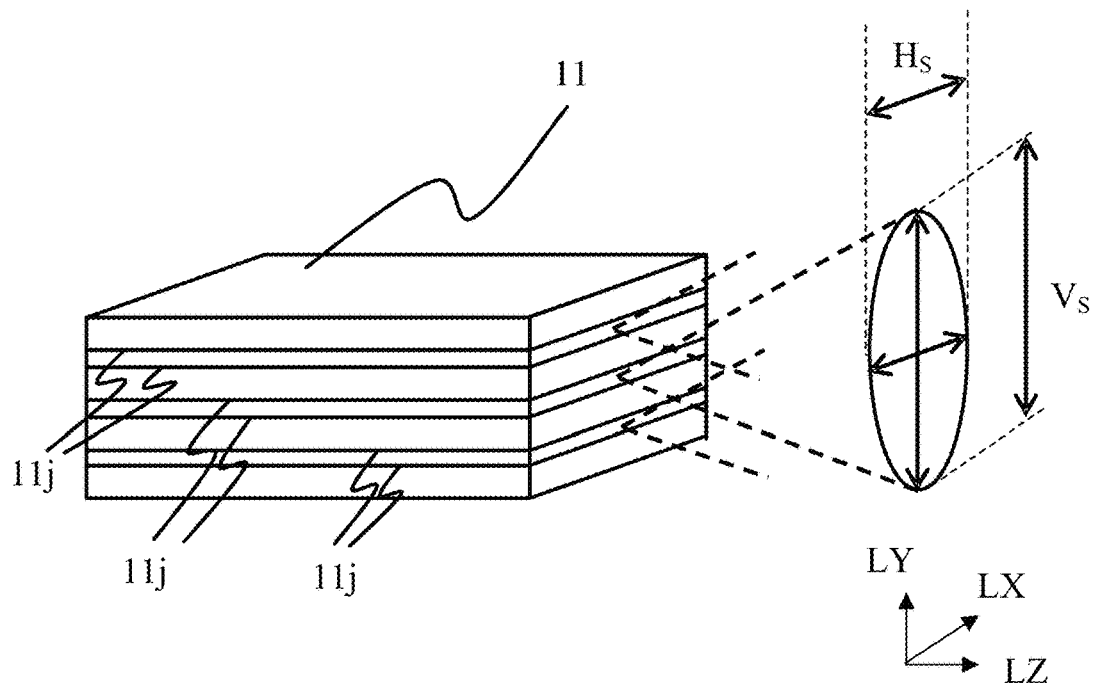
FIG. 2 explains a divergence angle of a laser diode.

FIG. 2 explains a divergence angle of LD. This embodiment uses a multistack multimode LD as an example of the light source 11. The light source 11 emits light having different divergence angles in a LX-axis direction and a LY-axis direction orthogonal to the LX-axis direction from a surface having a plurality of rectangular shaped intensity distributions. In this embodiment, the divergence angle in the direction orthogonal to a PN junction surface $11j$ is large and the divergence angle in the horizontal direction is small. That is, a length Hs of the light emitted from the light source 11 in the LX-axis direction is shorter than a length Vs in the LY-axis direction. In the light source 11, since the divergence angle is different, the light emitting position relative to the LX-axis is different from the light emitting position relative to the LY-axis, and a so-called astigmatic difference occurs. In addition, in a multistack light source, light emitters with different aspect ratios are often used to emit light.

In the light source unit 10, while the aspect ratio that is not 1:1 and the astigmatic difference of the light emitter in the light source 11 are used, a fixed diaphragm (aperture stop), a cylindrical lens, and the like (not shown) are disposed to emit substantially parallel light with a predetermined light beam diameter.

A bifurcation 20 bifurcates an illumination optical path for illuminating the object and a light receiving optical path for receiving the reflected light from the object. The bifurcation 20 includes, for example, a mirror having a through-hole (perforated mirror), and the illumination light passes through an opening during illuminations, and the reflected light is reflected by the mirror surface during light receptions.

A drive mirror (deflector) 30 deflects the illumination light to scan the object and deflects the reflected light from the object to guide the light to the bifurcation 20. The drive mirror 30 swings at a frequency "a" and a one-sided deflection angle "b" around a Y-axis passing through the center of the mirror, and also swings at a frequency "a'" (<a) and a one-sided deflection angle "b'" around an Mx-axis illustrated by an alternate long and short dash line perpendicular to the Y-axis passing through the center of the mirror. A light beam emitted from the light source unit 10 is reflected while tilted by an optical deflection angle θ when the drive mirror 30 swings around the Y-axis by a deflection angle θ/2 as a center.

A detector (light receiver) 40 includes an imaging lens 41, a light receiving element 42, and an unillustrated bandpass filter. The light receiving element 42 receives the light reflected or scattered from the object via the drive mirror 30 and the bifurcation 20. The detector 40 receives the light of the wavelength emitted from the light source 10 by the sensitivity of the light receiving element 42 and the bandpass filter, without receiving light having a wavelength different from that of the light emitted from the light source 10.

A controller 60 controls the light receiving element 42 so as to receive the reflected light from the object at a predetermined frequency while driving the light source and the drive mirror 30 at a predetermined driving voltage and a driving frequency.

Figure 3A:
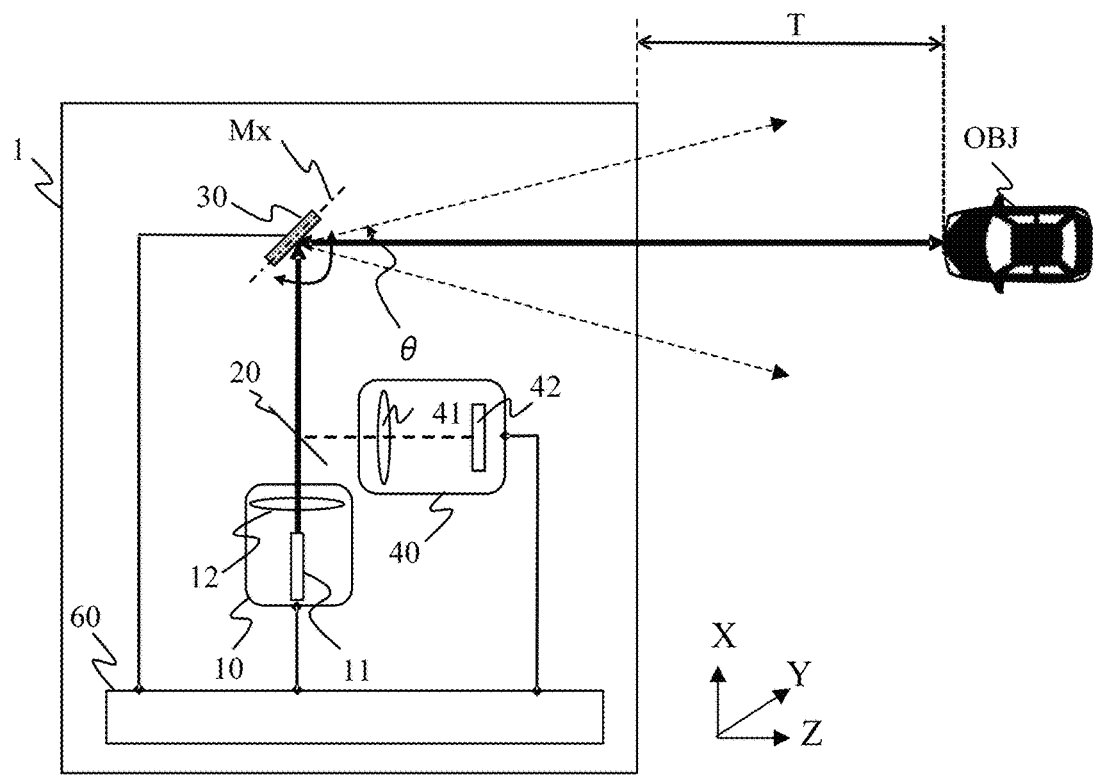
FIGS. 3A to 3C explain an illumination optical path of light emitted from a light source unit and a light receiving optical path of light received by a detector.
Figure 3B:
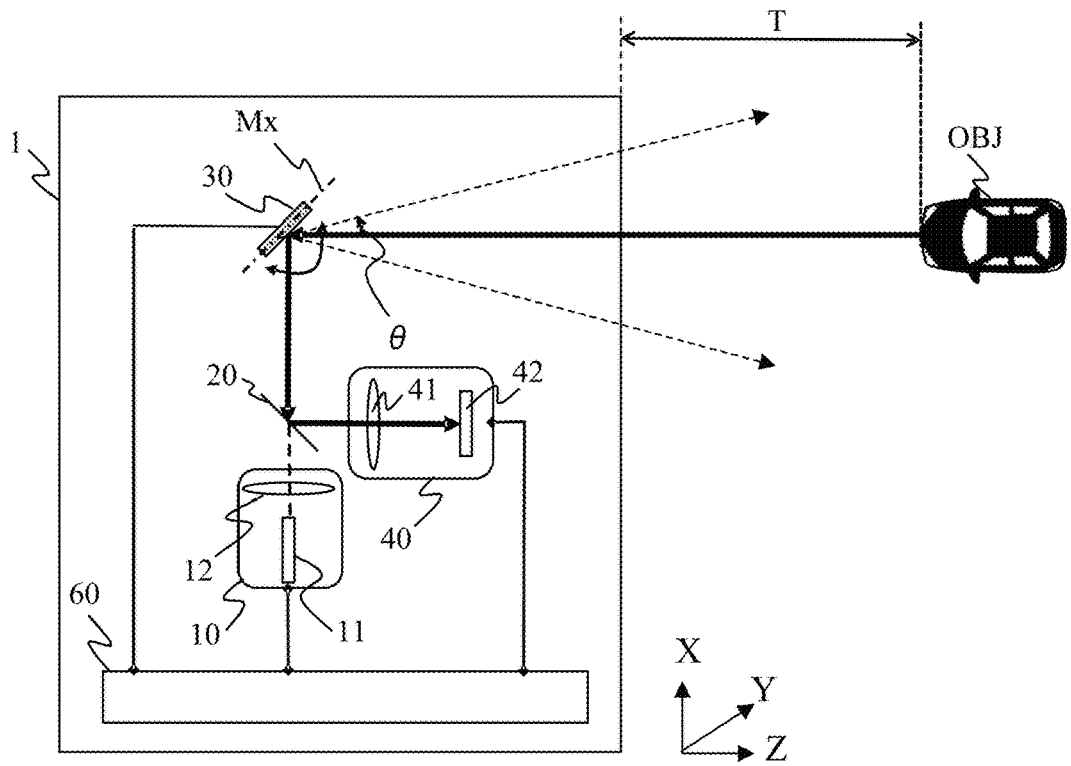
Figure 3C:
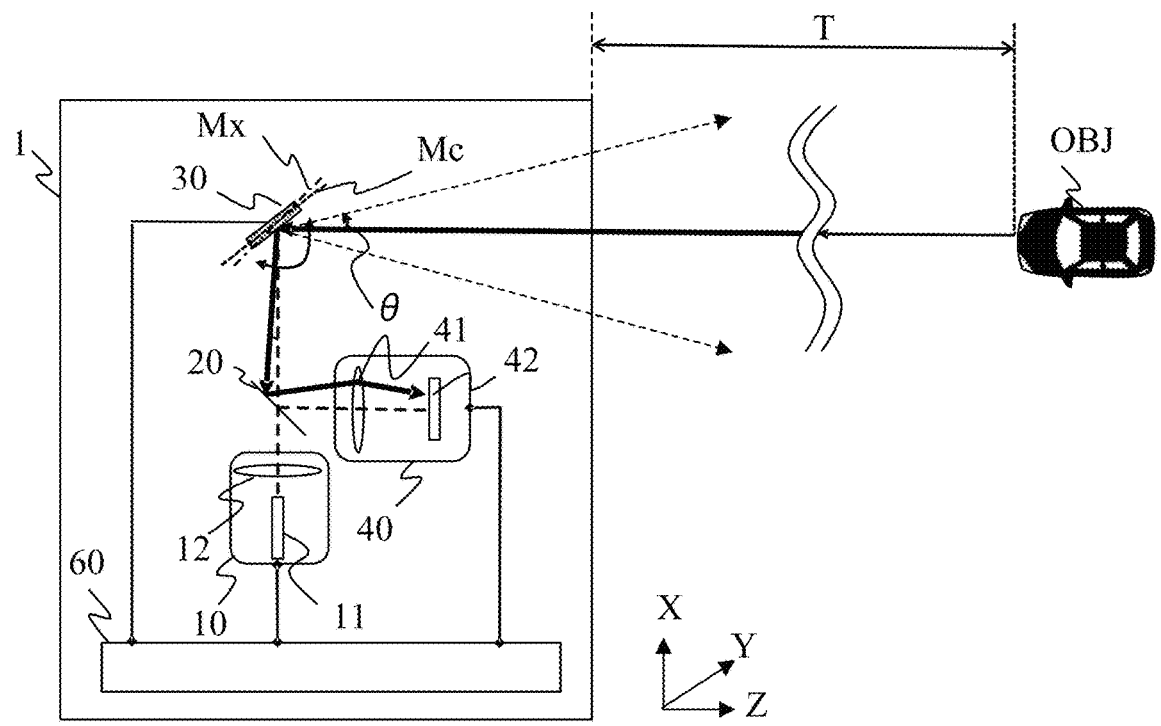

Referring now to FIGS. 3A to 3C, a description will be given of the illumination optical path of the light emitted from the light source unit 10 and the light receiving optical path of the light received by the detector 40. FIGS. 3A to 3C explain the illumination optical path of the light emitted from the light source unit 10 and the light receiving optical path of the light received by the detector 40. FIGS. 3A to 3C illuminate that the object is scanned in a direction horizontal to the ground.

FIG. 3A illustrates that the light emitted from the light source unit 10 scans and is reflected by the drive mirror 30 and illuminates an object OBJ separated by the distance T. FIG. 3B illuminates that the reflected or scattered light from the object OBJ is reflected on the drive mirror 30, reflected on the bifurcation 20, and condensed on the detector 40.

When the distance T to the object OBJ is large, the drive mirror 30 swings until the reflected light from the object OBJ returns, and the optical path from the drive mirror 30 to the detector 40 may change, as illustrated in FIG. 3C.

For example, if the drive mirror 30 moves fastest when the drive mirror 30 is driven at 1 kHz and a maximum deflection angle of 16° and the distance to the object OBJ is 150 m, the drive mirror 30 is displaced by 0.2° before the reflected light from the object OBJ returns. On the light receiving surface (detection surface) of the light receiving element 42, the imaging light is displaced by a shift amount determined by the displacement angle of the drive mirror 30 and the focal length of the imaging lens 41. When the imaging lens 41 has a focal length of 50 mm, the imaging light is displaced by 175 (=50×tan(0.2°)) μm.

Figures 4A, 4B:
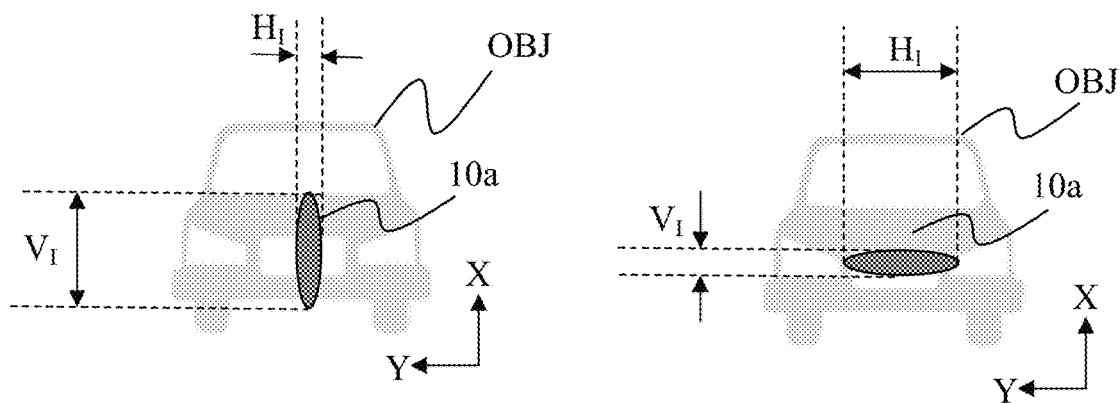
FIGS. 4A and 4B illustrate a relationship between an object and an illumination area.

As described above, in this embodiment, since the light emitter has an aspect ratio of not 1:1, the divergence angles of the illumination light are different from each other between the vertical direction and the horizontal directions. In the exit light traveling along the Z-axis in FIG. 3A, a divergence angle in the X direction is smaller than a divergence angle in the Y direction. That is, the illumination light emitted from the light source unit 10 according to this embodiment has a first section having a first divergence angle (plane orthogonal to the plane in FIGS. 3A to 3C) and a second section that has a second divergence angle smaller than the first divergence angle (plane parallel to the paper in FIGS. 3A to 3C) and is orthogonal to the first section. As a result, an illumination area 10a for the object OBJ becomes an area having an aspect ratio that is not 1:1 as illustrated in FIG. 4A. When the reflected light from the illumination area 10a is received by the detector 40 while the drive mirror 30 is stationary, an imaging area 30a on the light receiving surface 43 of the light receiving element 42 has an aspect ratio that is not 1:1 as illustrated in FIG. 5A. When the drive mirror 30 is sinusoidally driven at a predetermined frequency and the deflection angle θ is 0, the drive mirror 30 has the highest angular velocity. In that case, the imaging area 30a is formed at a position illustrated in FIG. 5A. If the light emitter has an aspect ratio of a reciprocal number, the illumination area 10a has an aspect ratio reciprocal to that of the illumination area 10a in FIG. 4A, as illustrated in FIG. 4B, and part of the imaging area 30a deviates from the light receiving surface 43 as illustrated in FIG. 5C and light shielding occurs. As a result, the reflected light from the long-distance object cannot be sufficiently captured.

This embodiment coincide with each other the direction in which the frequency of the drive mirror 30 is high and the direction in which the divergence angle of the light emitter of the light source 11 is small. In other words, the controller 60 controls the drive mirror 30 so that the illumination light moves at the first divergence angle in the first cross section at a first speed and moves at the second divergence angle in the second cross section at a second speed higher than the first speed. Thereby, even if the drive mirror 30 is displaced during the measurement of the long-distance object, the received light can be captured with no light shielding. That is, the configuration according to this embodiment can satisfactorily detect objects in a range from a short distance to a long distance regardless of the states of the deflection angle and the frequency of the drive mirror 30.

In this embodiment, the light receiving element 42 has the circular light receiving surface 43, but may have a rectangular or elliptical light receiving surface. In this case, a length in an optically equivalent direction on the light receiving surface to the fast scanning direction of the drive mirror 30 may be set to a length in an optically equivalent direction on the light receiving surface to the slow scanning direction of the drive mirror 30.

When the distance to the object is measured only in one direction of the drive mirror 30, the center of the light receiving element 42 and the imaging light center on the light receiving surface 43 may be set to offset from each other. For example, when the drive mirror 30 is stationary at the maximum deflection angle, the light receiving surface 43 and the imaging area 30a may have a relationship illustrated in FIG. 5B. If the drive mirror moves fastest at a deflection angle of 0, the light receiving surface 43 and the imaging area 30a may have a relationship in FIG. 5A or 5D. Thus, depending on the divergence angle of the illumination light, the frequency and deflection angle of the drive mirror 30, and the distance to the object, external light can be minimized and signal light can be properly received by limiting the size of the light receiving element 42 in the same optical direction as the fast swinging (driving) direction of the drive mirror 30.

The divergence angle direction of the illumination light and the direction of the drive mirror 30 may be rotated by 90° relative to FIGS. 3A to 3C as long as the conditions described in this embodiment are satisfied.

While this embodiment has described the case where the present invention is applied to the coaxial system, the present invention may be applied to the non-coaxial system.

Second Embodiment

Figure 6:
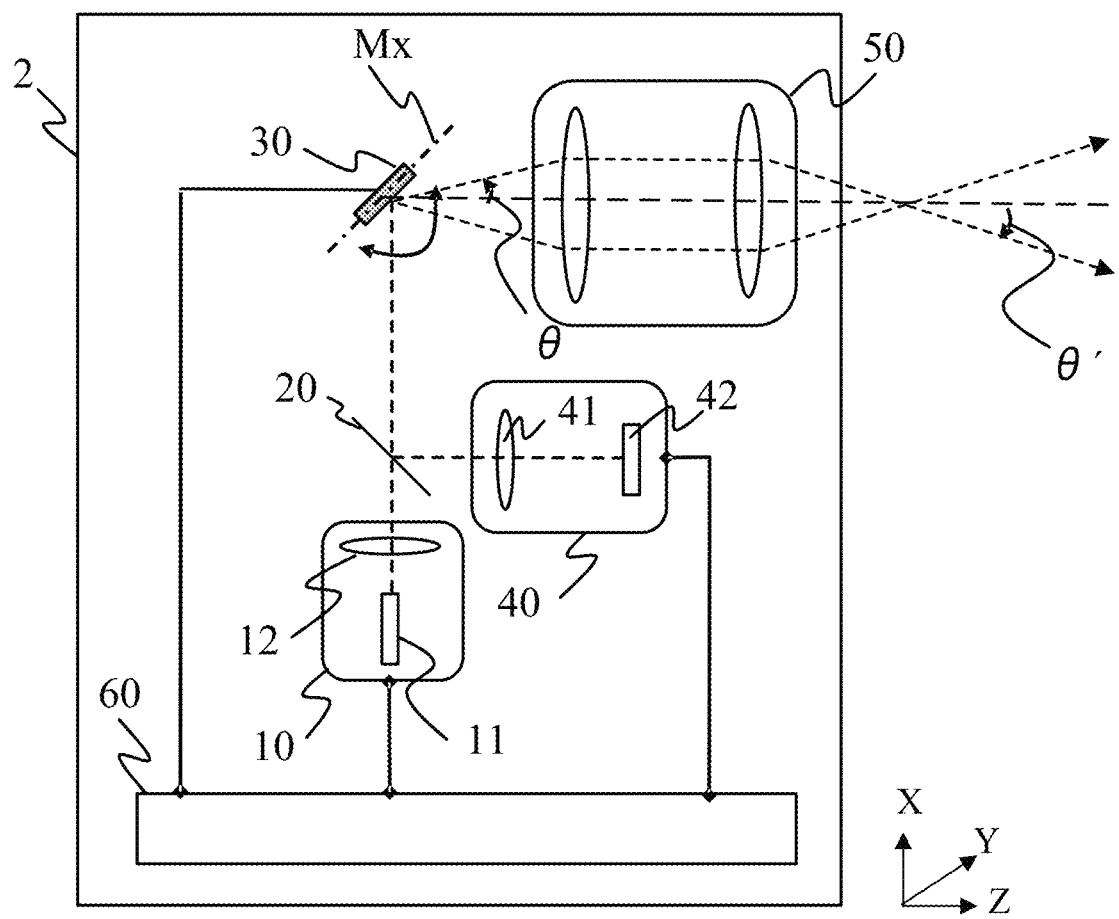
FIG. 6 schematically illustrates an optical apparatus according to a second embodiment.

FIG. 6 schematically illustrates an optical apparatus 2 according to this embodiment. The optical apparatus 2 differs from the optical apparatus 1 according to the first embodiment in that it has a magnification varying optical system 50 disposed on the light exit side of the drive mirror 30. Since other configurations are the same as those in the first embodiment, a detailed description thereof will be omitted.

The magnification varying optical system 50 is an optical system that magnifies a light beam diameter, for example, by a magnification β, and the light beam diameter on the light exit side is larger than that on the incident side. The magnification varying optical system 50 receives a light beam diameter that is a square of the magnification β relative to the effective diameter of the drive mirror 30. At this time, the detector 40 receives light having a light beam diameter that is the size of the drive mirror 30 on the mirror surface of the drive mirror 30.

It is generally desirable that there is no stray light within the angle of view, and it is desirable to devise so that the magnification varying optical system 50 has no stray light. For example, as illustrated in FIG. 7, the magnification varying optical system 50 may be decentered or tilted so that an optical axis Az does not coincide with the optical path of the principal ray of the illumination light from the drive mirror 30.

Figure 7:
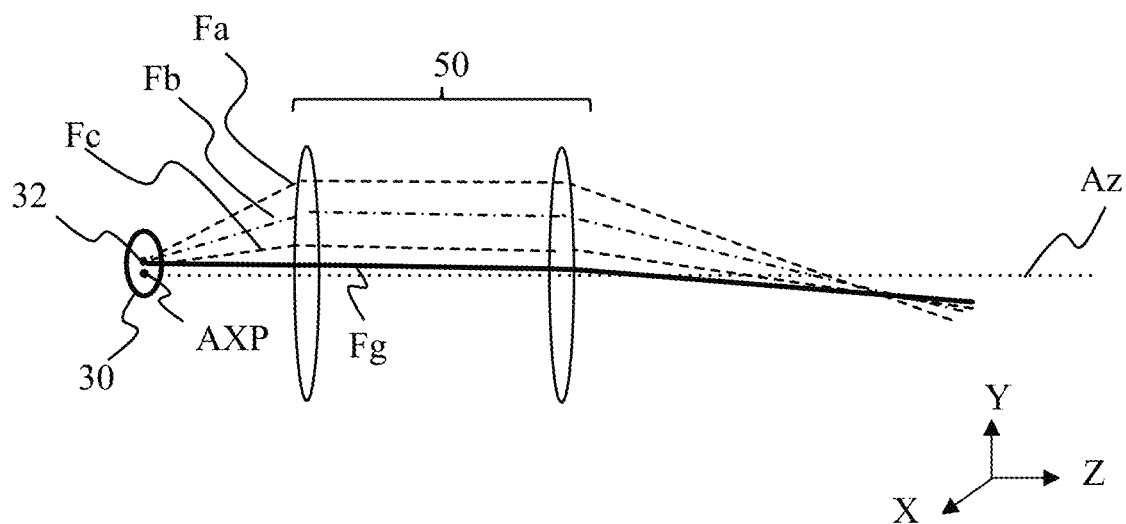
FIG. 7 illustrates a relationship between a magnification varying optical system and a drive mirror.

FIG. 7 illustrates a relationship between the magnification varying optical system 50 and the drive mirror 30, or a configuration on the light emission side of the drive mirror 30 on the YZ plane in the configuration of FIG. 6. Fa, Fb, and Fc are an illumination optical path at the most off-axis angle of view when the drive mirror 30 swings relative to the Mx-axis, an illumination optical path when the drive mirror 30 has a deflection angle of 0, and an illumination optical path Fa at the most off-axis angle of view opposite to the illumination optical path Fa, respectively. The illumination optical path Fc is the illumination optical path at the most off-axis angle of view used to measure the distance to the object OBJ, and is not the illumination optical path when the drive mirror 30 swings to the maximum. In a range where the drive mirror 30 tilts and reflects the light, only one side of each of the illumination optical paths Fa, Fb, and Fc is used with respect to the optical axis of the magnification varying optical system 50, and the illumination light is prevented from perpendicularly entering an optical element in the magnification varying optical system 50. Thereby, a slight amount of reflected light generated on the optical element surface does not reach the light receiving surface 43 of the light receiving element 42, and thus no stray light occurs.

Fg represents an illumination optical path when the drive mirror 30 has the largest deflection angle relative to the Mx-axis. When the illumination optical path Fg vertically enters the optical element in the magnification varying optical system 50, a slight amount of reflected light from the optical element passes through the same optical path as the illumination optical path Fg, is reflected by the bifurcation 20, and is detected as stray light by the detector 40. An angle of view between the illumination optical path Fc and the illumination optical path Fg is a margin for the angle of view at which stray light does not occur. For example, a deviation amount due to the manufacturing errors is provided as the margin.

FIG. 7 illuminates that an intersection AXP between the optical axis of the magnification varying optical system 50 and the drive mirror 30 shifts from the center 32 of the drive mirror 30, and that the magnification varying optical system 50 decenters from the drive mirror 30. When the magnification varying optical system 50 decenters from the drive mirror 30 (the drive mirror 30 is displaced so that the optical path of the principal ray in the illumination light at a central angle of view of the scanning angle of view of the drive mirror 30 and the optical axis of the magnification varying optical system 50 do not coincide with each other), the stray light from the illumination optical path Fg can be decentered. Since this configuration can expand the area where the stray light does not occur up to the angle of view outside the illumination optical path Fg, the direction on the illumination optical path Fg side of the illumination optical path Fc can be used to measure the distance to the object OBJ. When the illumination optical path Fb is distributed to the illumination optical path Fg side, the illumination optical path Fa can be distributed to the optical axis center side of the magnification varying optical system 50, and thus the effective diameter of the magnification varying optical system 50 is reduced and the optical apparatus 2 can wholly be made compact. Thus, the center 32 of the drive mirror 30 and the optical axis of the magnification varying optical system 50 may not coincide on the drive mirror 30.

Since this embodiment provides the magnification varying optical system 50, the divergence angle of the light beam corresponding to the exit angle is $1/\beta$. That is, $H_1=H_M/\beta$ is established where $H_M$ is a divergence angle of the light beam reflected by the drive mirror 30 relative to the horizontal plane and $H_1$ is a divergence angle of the light beam emitted from the magnification varying optical system 50 relative to the horizontal plane. In addition, $V_1=V_M/\beta$ is established where $V_M$ is a divergence angle of the light beam reflected by the drive mirror 30 relative to the vertical plane and $V_1$ is a divergence angle of the light beam emitted from the magnification varying optical system 50 relative to the vertical plane.

The drive mirror 30 swings at a frequency "a" and a one-sided deflection angle "b" around a Y-axis passing through the center of the mirror, and also swings at a frequency "a'" (<a) and a one-sided deflection angle b' around an Mx-axis indicated by an alternate long and short dash line perpendicular to the Y-axis passing through the center of the mirror.

When the drive mirror 30 passes the central angle of view at which it is most displaced, the reflected light from the object OBJ is reflected by the drive mirror by an angle of $\theta_M$ and is received by the detector 40. At that time, the position shifts by an amount represented by $f \cdot \tan \theta_M$ where f is a focal length of the imaging lens 41.

Where T is a distance from the object OBJ, it takes time t seconds from when the illumination light is emitted to the object OBJ to when the reflected light from the object is returned is 2T/c (c is the light speed). The shift of the drive mirror 30 becomes maximum when the drive mirror 30 passes the central angle of view at which the drive mirror 30 is most displaced (when the deflection angle θ is 0), and the shift amount $\theta_M$ is expressed as 2abπ from a maximum value of a differential of b·sin(a·2π·t). The positional shift of the light receiving surface caused by the shift of the drive mirror 30 is expressed as f·tan (2$\theta_M$). When the actual imaging area is enlarged by an enlargement ratio g relative to the ideal imaging area due to the blurs of the imaging position, a width $H_R$ of the light receiving element 42 in the optically equivalent direction to the fast scanning direction of the drive mirror 30 may satisfy the following conditional expressions:

$$H_R \leq 2 \times f \times \tan(H_1 \times \beta/2) = 2 \times f \times \tan(H_M/2)$$

$$H_R \leq 2 \times \{f \times \tan(H_1 \times \beta/2) + f \times \tan(2\theta_M) \times g\} = 2 \times \{f \times \tan(H_M/2) + f \times \tan(2\theta_M) \times g\}$$

For example, when the optical apparatus 2 is used for a full-automatic driving sensor, as long as the distance to the object OBJ that is 300 m away can be measured, it is possible to sufficiently determine whether the object OBJ is stationary, avoiding, or approaching. Since the horizontal angle of view may be about 0.1°, Hd'=0.1 and T=300 are substituted for the above expressions to calculate the width $H_R$ of the light receiving element 42, the focal length f of the imaging lens 41, and the magnification β of the magnification varying optical system 50. The focused spot becomes larger than the ideal value at a rate of g, but it is sufficient to limit g to about 1.5 relative to the angle of view when the illumination area is imaged as it is.

Due to such a configuration, the size of the light receiving element 42 is reduced, and external light other than the signal light can be minimized. That is, the configuration according to this embodiment can satisfactorily detect objects in a range from a short distance to a long distance regardless of states of the deflection angle and the frequency of the drive mirror 30. The configuration using the magnification varying optical system as in this embodiment is effective in detecting an object at a longer distance.

On-Board System

Figure 8:
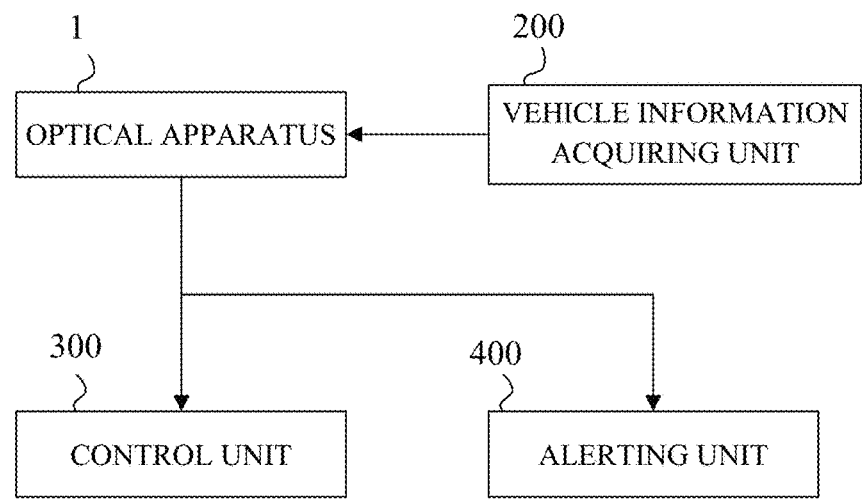
FIG. 8 illustrates a configuration of an on-board system according to this embodiment.
Figure 9:
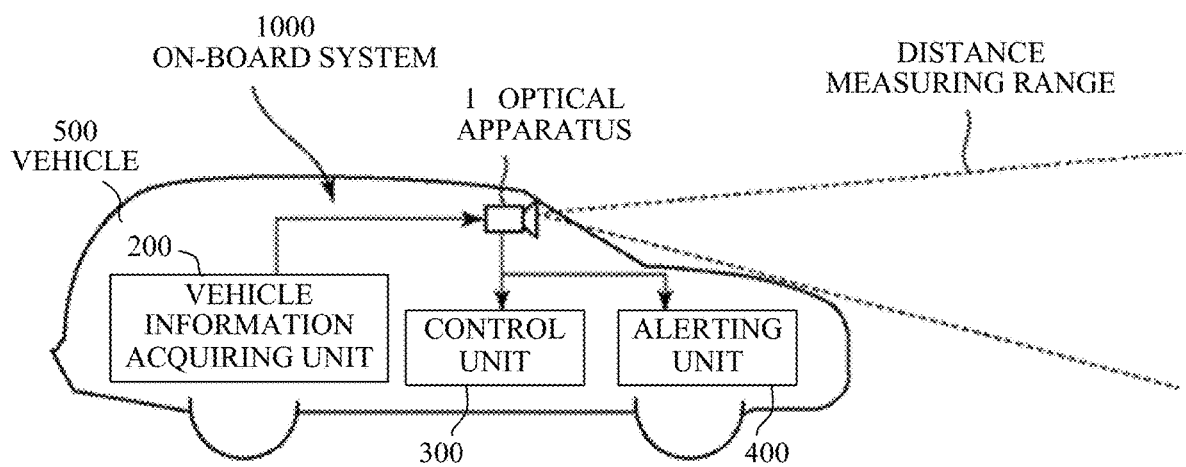
FIG. 9 schematically illustrates a vehicle (moving apparatus) according to this embodiment.

FIG. 8 illustrates a configuration of the optical apparatus 1 according to this embodiment and an on-board system (driving support apparatus) 1000 including the optical apparatus 1. The on-board system 1000 is an apparatus held by a movable moving object (moving apparatus) such as a vehicle or a drone, and configured to support the driving (control) of the vehicle based on distance information of the object such as an obstacle or a pedestrian around the vehicle acquired by the optical apparatus 1. FIG. 9 schematically illustrates a moving apparatus (referred to as vehicle hereinafter) 500 including an on-board system 1000. Although FIG. 9 illuminates the case where the distance measuring range (detecting range) of the optical apparatus 1 is set to the front of the vehicle 500, the distance measuring range may be set to the back or side of the vehicle 500.

As illustrated in FIG. 8, the on-board system 1000 includes an optical apparatus 1, a vehicle information acquiring unit 200, a control unit (ECU: electronic control unit) 300, and an alerting unit 400. In the on-board system 1000, the controller 60 included in the optical apparatus 1 serves as a distance acquiring unit (acquirer) and a collision determiner. If necessary, the on-board system 1000 may be provided with a distance acquiring unit and a collision determiner that are separate from the controller 60, or may be provided outside the optical apparatus 1 (for example, inside the vehicle 500). Alternatively, the control unit 300 may be used as the controller 60.

Figure 10:
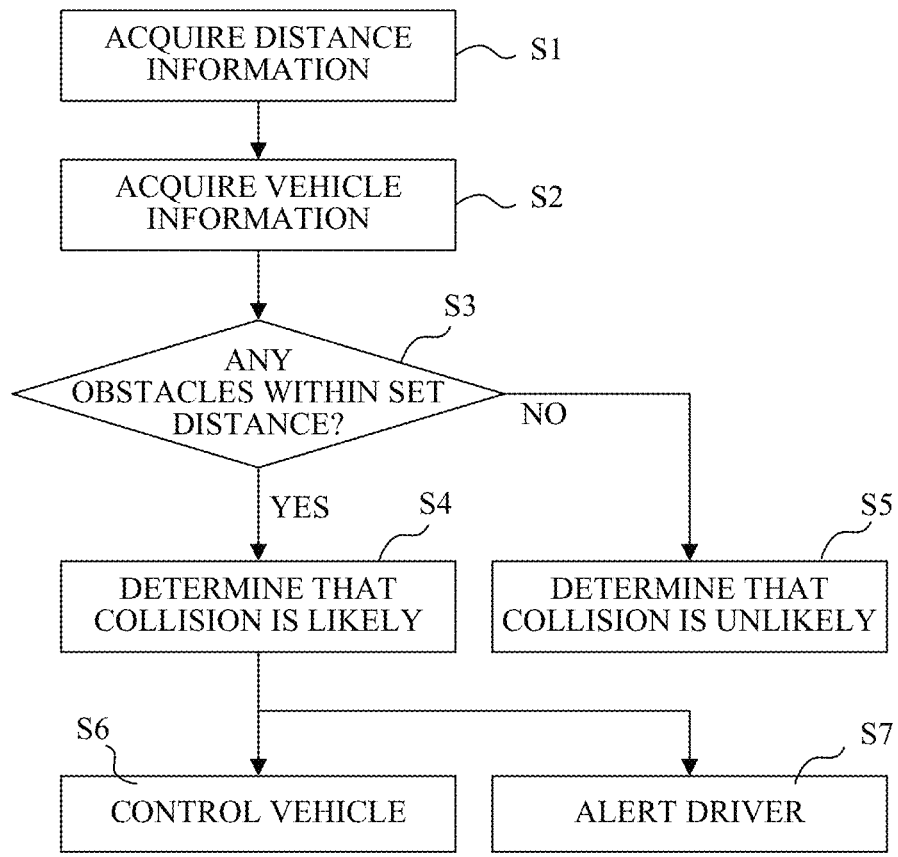
FIG. 10 is a flowchart showing an illustrative operation of the on-board system according to this embodiment.

FIG. 10 is a flowchart showing an illustrative operation of the on-board system 1000 according to this embodiment. The operation of the on-board system 1000 will be described below with reference to this flowchart.

First, in the step S1, the controller 60 acquires distance information of the object based on the signal output from the light receiving element by illuminating the object around the vehicle by the light source unit of the optical apparatus 1 and by receiving the reflected light from the object. In the step S2, the vehicle information acquiring unit 200 acquires vehicle information including the vehicle speed, yaw rate, steering angle, and the like. Then, in the step S3, the controller 60 uses the distance information acquired in the step S1 and the vehicle information acquired in the step S2 and determines whether the distance to the object falls within a range of the preset distance.

This configuration can determine whether or not the object exists within the set distance around the vehicle, and determine whether or not the collision between the vehicle and the object is likely. The steps S1 and S2 may be performed in the reverse order or in parallel. The controller 60 determines that "the collision is likely" when the object exists within the set distance (step S4), and determines that "the collision is unlikely" when the object does not exist within the set distance (step S5).

Next, when the controller 60 determines that "the collision is likely", the controller 60 notifies (transmits) the determination result to the control unit 300 and the alerting unit 400. Then, the control unit 300 controls the vehicle based on the determination result of the controller 60 (step S6), and the alerting unit 400 alerts the vehicle user (driver) based on the determination result of the controller 60 (step S7). The notice of the determination result may be sent to at least one of the control unit 300 and the alerting unit 400.

The control unit 300 can control a movement of the vehicle by outputting a control signal to the driving device (engine, motor, etc.) of the vehicle. For example, a control signal is generated to apply a brake in the vehicle, to return an accelerator pedal, to turn a steering wheel, and to generating a braking force on each wheel, to suppress the output of the engine or the motor. The alerting unit 400 alerts the driver by issuing an alert sound, by displaying alert information on a screen of a car navigation system, or by vibrating a seat belt or a steering wheel.

As described above, the on-board system 1000 according to this embodiment can detect the object and measure the distance by the above processing, and avoid the collision between the vehicle and the object. In particular, the optical apparatus 1 according to each of the above embodiments applied to the on-board system 1000 can measure the distance with high accuracy, and thus detect the object and determine the likelihood of the collision with high accuracy.

While this embodiment applies the on-board system 1000 to the driving support (collision damage reduction), but the present invention is not limited to this embodiment, and the on-board system 1000 is applicable to the cruise control (including a following function) and automatic driving. The on-board system 1000 is applicable not only to vehicles such as automobiles but also to moving objects such as ships, aircrafts, and industrial robots. The present invention is applicable not only to a moving object but also to various devices utilizing object recognitions such as an intelligent transportation system (ITS) and a surveillance system.

If the vehicle 500 should collide with an obstacle, the on-board system 1000 or the vehicle 500 may include a notifying unit that notifies a manufacturer of the on-board system, a distributor of the moving apparatus, or the like of the collision. For example, the notifying unit may use a device that transmits information (collision information) on a collision between the vehicle 500 and an obstacle to an external preset destination by e-mail or the like.

Due to the configuration in which the notifying unit automatically notifies the collision information, any measures can be promptly taken such as an inspection and a repair after the collision occurs. The destination of the collision information may be an insurance company, a medical institution, the police, or any other destination arbitrarily set by the user. The notifying unit may be configured to notify the destination of not only the collision information but also failure information of each part and consumption information of consumables. A collision may be detected using the distance information acquired based on the output from the above light receiver, or may be detected by another detector (sensor).

The above embodiment can provide an optical apparatus, an on-board system, and a moving apparatus, each of which can satisfactorily detect objects in a range from a short distance to a long distance regardless of a state of a drive mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128046, filed on Jul. 10, 2019, which is hereby incorporated by reference herein in its entirety.

What is claimed is:

1. An optical apparatus comprising:
a deflector configured to deflect illumination light from a light source unit to scan an object and to deflect reflected light from the object;
a controller configured to control the deflector;
a light-guiding member configured to guide the illumination light from the light source unit to the deflector and to guide the reflected light from the deflector to a light receiver; and
a magnification varying optical system configured to guide the illumination light from the deflector to the object and to guide the reflected light from the object to the deflector,
wherein a first divergence angle of the illumination light from a single light source of the light source unit in a first cross section is larger than a second divergence angle in a second cross section orthogonal to the first section, and
wherein the controller controls the deflector so that the illumination light moves in the first cross section at a first speed and moves in the second cross section at a second speed higher than the first speed.

2. The optical apparatus according to claim 1, wherein on a light receiving surface of a light receiver, a length in an optically equivalent direction on the light receiving surface to a direction in which the illumination light moves at the second speed is longer than a length in the optically equivalent direction on the light receiving surface to a direction in which the illumination light moves at the first speed.

3. The optical apparatus according to claim 1, wherein a center of a light receiving surface of the light receiver is eccentric to a center of the light receiver in an optically equivalent direction on the light receiving surface to a direction in which the illumination light moves at the second speed.

4. The optical apparatus according to claim 1, wherein an optical axis of the magnification varying optical system does not coincide with a principal ray in the illumination light at a central angle of view of a scanning angle of view of the deflector.

5. The optical apparatus according to claim 1, wherein the following conditional expressions are satisfied:

$H_R \geq 2 \times f \times \tan(H_I \times \beta/2)$;

$H_R \geq 2 \times \{f \times \tan(H_I \times \beta/2) + f \times \tan(a \times b \times 4\pi \times 2T/c) \times g\}$;

$T \leq 300$; and $g \leq 1.5$, where f is a focal length of an imaging lens included in a light receiver, a and b respectively are a frequency and a maximum deflection angle of the deflector when the illumination light of the deflector moves at the second speed, g is a ratio of expansion of an actual imaging area to an ideal imaging area on a light receiving surface of the light receiver, $\beta$ is a magnification of the magnification varying optical system, $H_I$ is a second divergence angle, T (in m) is a distance from the optical apparatus to the object, c is a light speed, and $H_R$ is a width (in m) of the light receiving surface in an optically equivalent direction on the light receiving surface to a direction in which the illumination light moves at the second speed.

6. A moving apparatus comprising:
the optical apparatus according to claim 1,
wherein optical apparatus is mounted to the moving apparatus, which is movable while holding the optical apparatus.

7. The moving apparatus according to claim 6, further comprising a notifying unit configured to notify a remotely located apparatus regarding information on a collision with the object.

8. The moving apparatus according to claim 6, wherein the controller is further configured to:
obtain distance information of the object; and
determine whether a collision with the object is likely based on the obtained distance information of the object.

9. The moving apparatus according to claim 8, further comprising a control unit configured to output a control signal that controls a movement when the controller determines that a collision with the object is likely.

10. The moving apparatus according to claim 8, further comprising an alerting unit configured to alert a driver of the moving apparatus when the controller determines that a collision with the object is likely.

11. An on-board system for a vehicle, the on-board system comprising:
an optical apparatus comprising:
a deflector configured to deflect illumination light from a light source unit to scan an object and to deflect reflected light from the object;
a controller configured to control the deflector;
a light-guiding member configured to guide the illumination light from the light source unit to the deflector and to guide the reflected light from the deflector to a light receiver; and
a magnification varying optical system configured to guide the illumination light from the deflector to the object and to guide the reflected light from the object to the deflector,
wherein a first divergence angle of the illumination light from a single light source of the light source unit in a first cross section is larger than a second divergence angle in a second cross section orthogonal to the first section, wherein the controller controls the deflector so that the illumination light moves in the first cross section at a first speed and moves in the second cross section at a second speed higher than the first speed, and wherein the controller obtains distance information of the object; and a control unit configured to determine whether the vehicle and the object are likely to collide with each other based on the obtained distance information of the object.

12. The on-board system according to claim 11, wherein the control unit is configured to output a control signal for generating a braking force on the vehicle when the control unit determined that the vehicle and the object are likely to collide with each other.

13. The on-board system according to claim 11, further comprising an alerting unit configured to alert a driver of the vehicle when the control unit determines that the vehicle and the object can collide with each other.

14. The on-board system according to claim 11, further comprising a notifying unit configured to notify a remotely located apparatus regarding information on a collision between the vehicle and the object.

15. An optical apparatus comprising:

a deflector configured to deflect illumination light from a light source unit to scan an object and to deflect reflected light from the object;

a controller configured to control the deflector;

a light-guiding member configured to guide the illumination light to the deflector and to guide the reflected light from the deflector to a light receiver; and a magnification varying optical system configured to guide the illumination light from the deflector to the object and to guide the reflected light from the object to the deflector, wherein an optical axis of the magnification varying optical system does not coincide with a principal ray in the illumination light at a central angle of view of a scanning angle of view of the deflector, wherein a first divergence angle of the illumination light in a first cross section is larger than a second divergence angle in a second cross section orthogonal to the first section, and wherein the controller controls the deflector so that the illumination light moves in the first cross section at a first speed and moves in the second cross section at a second speed higher than the first speed.

* * * * *